(12) United States Patent
Zhi et al.

(10) Patent No.: US 9,088,913 B2
(45) Date of Patent: Jul. 21, 2015

(54) METHOD AND APPARATUS FOR REPORTING SCHEDULING INFORMATION

(71) Applicant: Huawei Technologies Co., Ltd., Shenzhen, Guangdong (CN)

(72) Inventors: Yuliang Zhi, Beijing (CN); Bingzhao Li, Beijing (CN); Yanyan Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 119 days.

(21) Appl. No.: 14/091,840

(22) Filed: Nov. 27, 2013

(65) Prior Publication Data

US 2014/0086088 A1 Mar. 27, 2014

Related U.S. Application Data

(63) Continuation of application No. PCT/CN2012/077180, filed on Jun. 20, 2012.

(30) Foreign Application Priority Data

Jun. 20, 2011 (CN) .......................... 2011 1 0166133

(51) Int. Cl.
*H04W 24/10* (2009.01)
*H04W 72/12* (2009.01)

(52) U.S. Cl.
CPC .......... *H04W 24/10* (2013.01); *H04W 72/1284* (2013.01); *H04W 72/1289* (2013.01)

(58) Field of Classification Search
None
See application file for complete search history.

(56) References Cited

U.S. PATENT DOCUMENTS

| 8,400,935 B2 * | 3/2013 | Pelletier et al. ............... 370/252 |
| 2009/0103479 A1 * | 4/2009 | Goto et al. .................... 370/328 |

(Continued)

FOREIGN PATENT DOCUMENTS

| CN | 101340712 A | 1/2009 |
| CN | 101491153 A | 7/2009 |

(Continued)

OTHER PUBLICATIONS

"E-RUCCH of MC-HSUPA UE for 1.28Mcps TDD," 3GPP TSG-RAN WG1#60bis, Beijing, China, R1-102445, 3rd Generation Partnership Project, Valbonne, France (Apr. 12-16, 2010).

(Continued)

*Primary Examiner* — Hong Cho
(74) *Attorney, Agent, or Firm* — Leydig, Voit & Mayer, Ltd.

(57) ABSTRACT

Embodiments of the present invention disclose a method and an apparatus for reporting scheduling information. The method includes: configuring a carrier as a primary carrier and configuring other carriers as secondary carriers according to an indication message sent by a network; setting a reporting format, where the reporting format includes a first reporting format and a second reporting format, the first reporting format includes UPH, TEBS, HLBS, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information; and reporting scheduling information in the reporting format to the network.

30 Claims, 9 Drawing Sheets

(56) References Cited

U.S. PATENT DOCUMENTS

| | | |
|---|---|---|
| 2009/0245213 A1 | 10/2009 | Zaki et al. |
| 2010/0273515 A1* | 10/2010 | Fabien et al. ............... 455/509 |
| 2011/0128926 A1 | 6/2011 | Nama et al. |
| 2013/0301576 A1 | 11/2013 | Miki et al. |
| 2014/0105160 A1* | 4/2014 | Torsner et al. ............... 370/329 |
| 2014/0119318 A1* | 5/2014 | Zhu et al. ............... 370/329 |

FOREIGN PATENT DOCUMENTS

| | | |
|---|---|---|
| CN | 101567763 A | 10/2009 |
| CN | 101754328 A | 6/2010 |
| CN | 101754393 A | 6/2010 |
| CN | 101938839 A | 1/2011 |
| CN | 101959246 A | 1/2011 |
| WO | WO 02069665 A2 | 9/2002 |
| WO | WO 2010129146 A2 | 11/2010 |

OTHER PUBLICATIONS

3GPP TS 25.321—$3^{rd}$ Generation Partnership Project; Technical Specification Group Radio Access Network; Medium Access Control (MAC) protocol specification (Release 10), Version 10.2.0, $3^{rd}$ Generation Partnership Project, Valbonne, France (Mar. 2011).

* cited by examiner

METHOD AND APPARATUS FOR REPORTING SCHEDULING INFORMATION

CROSS-REFERENCE TO RELATED APPLICATIONS

This application is a continuation of International Patent Application No. PCT/CN2012/077180, filed on Jun. 20, 2012, which claims priority to Chinese Patent Application No. 201110166133.2, filed on Jun. 20, 2011, both of which are hereby incorporated by reference in their entireties.

TECHNICAL FIELD

The present invention relates to the field of communications technologies, and in particular, to a method and an apparatus for reporting scheduling information.

BACKGROUND

With continuous development of third-generation mobile communications technologies, the 3GPP (3rd Generation Partnership Project, 3rd generation partnership project) has introduced HSDPA (High Speed Downlink Packet Access, high speed downlink packet access) and HSUPA (High Speed Uplink Packet Access, high speed uplink packet access) technologies, and also introduced downlink multi-carrier and uplink multi-carrier technologies, which can further improve a peak rate of a user and throughput of a cell. In HSUPA, data transmission modes include scheduled transmission and non-scheduled transmission. For scheduled transmission, a network needs to learn, according to SI (Scheduling Information, scheduling information) information and a Happy Bit that are reported by a UE (User Equipment, user equipment), the resource use state of the UE, and delivers AG (Absolute Grant, absolute grant) and RG (Relative Grant, relative grant) scheduling authorization information to the UE; and the UE adjusts a corresponding data rate according to send data after receiving the scheduling authorization information. Currently, SI information reporting solutions include single-carrier reporting and dual-carrier reporting.

Currently, when SI information is reported by using a single carrier or dual carriers, a reporting format is shown in Table 1:

TABLE 1

| UPH (5 bits) | TEBS (5 bits) | HLBS(4 bits) | HLID (4 bits) |
| --- | --- | --- | --- |

UPH (UE Power Headroom): user equipment power headroom, which is defined as a ratio of maximum transmit power of a UE to DPCCH power, where the maximum transmit power of the UE is determined by a UE level or configuration on a network.

TEBS (Total E-DCH Buffer Status): a total amount of data to be sent in a current buffer. This field indicates an amount of data of a logical channel buffer reported in all RRC requests, that is, a total amount (in a unit of bytes) of corresponding data to be transmitted and retransmitted at an RLC layer.

HLBS (Highest priority Logical channel Buffer Status): highest priority logical channel buffer status. This field indicates a ratio of a logical channel buffer data amount indicated by an HLID to a TEBS buffer amount.

HLID (Highest priority Logical channel ID): highest priority logical channel identity. This field indicates a logical channel with a highest priority of data in a transmit buffer of the UE. If there is more than one such logical channel, a logical channel with a highest data share in the transmit buffer is the specified logical channel.

In the process of implementing the present invention, the inventor finds that at least the following problem exists in the prior art: When multiple carriers use the existing single-carrier or dual-carrier SI information format to report SI information, SI information reported by each reporting carrier is completely same except for UPH information, thereby causing a waste of system resources.

SUMMARY

Multiple aspects of the present invention provide a method and an apparatus for reporting scheduling information to effectively improve utilization of system resources.

On one aspect of the present invention, a method for reporting scheduling information is provided, including:

configuring a carrier as a primary carrier and configuring other carriers as secondary carriers according to an indication message sent by a network;

setting a reporting format, where the reporting format includes a first reporting format and a second reporting format, the first reporting format includes UPH information, TEBS information, HLBS information, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information; and reporting scheduling information in the reporting format to the network, where scheduling information of the primary carrier is reported in the first reporting format, and scheduling information of the secondary carriers is reported in the first reporting format or the second reporting format.

On another aspect of the present invention, a method for reporting scheduling information is further provided, including:

sending an indication message to a user equipment to instruct the user equipment to configure a carrier as a primary carrier and configure other carriers as secondary carriers;

receiving scheduling information reported by the user equipment, where the scheduling information is reported in a first reporting format through the primary carrier and in the first reporting format or a second reporting format through the secondary carriers, the first reporting format includes UPH information, TEBS information, HLBS information, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information; and parsing the received scheduling information to obtain scheduling information of each carrier.

On still another aspect of the present invention, an apparatus for reporting scheduling information is further provided, including:

a configuring module, configured to configure a carrier as a primary carrier and configure other carriers as secondary carriers according to an indication message sent by a network;

a setting module, configured to set a reporting format, where the reporting format includes a first reporting format and a second reporting format, the first reporting format includes UPH information, TEBS information, HLBS information, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information; and a reporting module, configured to report scheduling information in the reporting format to the network, where scheduling information of the primary carrier is reported in the first reporting format, and scheduling information of the secondary carriers is reported in the first reporting format or the second reporting format.

On still another aspect of the present invention, an apparatus for processing scheduling information is further provided, including:

a sending module, configured to send an indication message to a user equipment to instruct the user equipment to configure a carrier as a primary carrier and configure other carriers as secondary carriers;

a receiving module, configured to receive scheduling information reported by the user equipment, where the scheduling information is reported in a first reporting format through the primary carrier and in the first reporting format or a second reporting format through the secondary carriers, the first reporting format includes UPH information, TEBS information, HLBS information, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information; and a parsing module, configured to parse the received scheduling information to obtain scheduling information of each carrier.

In the method and the apparatus for reporting scheduling information according to the embodiments of the present invention, UPH, TEBS, HLBS, and HLID information of carrier scheduling information is reported in a first reporting format, and UPH information of the carrier scheduling information is reported in a second reporting format. The embodiments of the present invention are especially applicable to reporting scheduling information of multiple carriers, and can save system resources as compared with the prior art.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
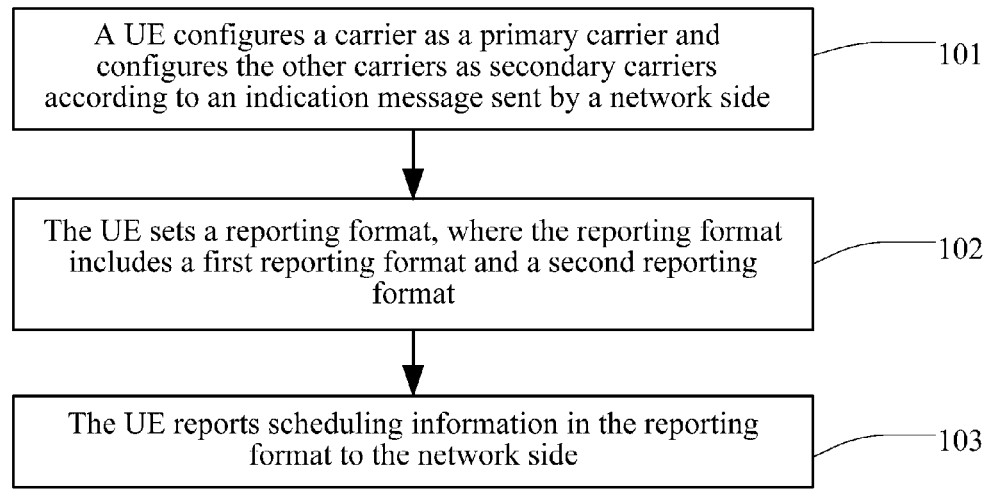
FIG. 1 is a flowchart of a method according to an embodiment of the present invention.

In the following description, for the purpose of description other than limitation, specific details such as specific system architectures, interfaces, and technologies are proposed to help thoroughly understand the present invention. However, a person of ordinary skill in the art should understand that the present invention may also be implemented in other embodiments without these specific details. In other cases, detailed description of well-known apparatuses, circuits, and methods is omitted to prevent unnecessary details from hindering the description of the present invention.

Various technologies described in this specification may apply to various wireless communications systems, such as current 2G and 3G communications systems and next-generation communications systems, such as GSM (Global System for Mobile communications, global system for mobile communications) system, CDMA (Code Division Multiple Access, code division multiple access) system, TDMA (Time Division Multiple Access, time division multiple access) system, WCDMA (Wideband Code Division Multiple Access, wideband code division multiple access) system, FDMA (Frequency Division Multiple Access, frequency division multiple access) system, OFDMA (Orthogonal Frequency-Division Multiple Access, orthogonal frequency-division multiple access) system, SC-FDMA (Single Carrier-FDMA, single carrier-FDMA), GPRS (General Packet Radio Service, general packet radio service) system, LTE (Long Term Evolution, long term evolution) system, and other similar communications systems.

In this specification, various aspects are described with reference to a terminal and/or a base station and/or a base station controller.

The terminal may be a wireless terminal or a wired terminal. The wireless terminal may be a device that provides voice and/or data connectivity to a user, a handheld device capable of a wireless connection function, or other processing devices connected to a wireless modem. The wireless terminal may communicate with one or more core networks through a wireless access network (such as an RAN, radio access network). The wireless terminal may be a mobile terminal, such as a mobile phone (or called a "cellular" phone) or a computer equipped with a mobile terminal. For example, the wireless terminal may be a portable, pocket-type, handheld, computer-embedded, or vehicle-mounted mobile apparatus, which exchanges a language and/or data with the wireless access network. For example, the wireless terminal may be a PCS (Personal Communication Service, personal communication service) phone, a cordless phone, a SIP (Session Initiation Protocol) phone, a WLL (Wireless Local Loop, wireless local loop) station, a PDA (Personal Digital Assistant, personal digital assistant), or the like. The wireless terminal may also be named a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The base station (such as an access point) may be a device that communicates with a wireless terminal through one or more sectors on an air interface in an access network. The base station may be configured to perform conversion between a received air frame and an IP packet, and serve as a router between the wireless terminal and the rest part of the access network, where the rest part of the wireless network may include an Internet Protocol (IP) network. The base station may further coordinate attribute management of the air interface. For example, the base station may be a base transceiver station (BTS, Base Transceiver Station) in GSM or CDMA, or a NodeB (NodeB) in WCDMA, or an evolutional NodeB (NodeB or eNB or e-NodeB, evolved NodeB) in LTE, which is not limited in the present invention.

The base station controller may be a BSC (Base Station Controller, base station controller) in GSM or CDMA, or an RNC (Radio Network Controller, radio network controller) in WCDMA, which is not limited in the present invention.

Furthermore, the terms "system" and "network" in this specification are often interchangeable for use in this specification. The term "and/or" in this specification is used only to describe a correlative relationship between correlated objects and indicates that three relationships may exist. For example, "A and/or B" may indicate the following three cases: A separately exists, A and B exist simultaneously, and B separately exists. In addition, generally, the symbol "/" in this specification indicates an "or" relationship between a preceding correlated object and a succeeding correlated object.

An embodiment of the present invention provides a method for reporting scheduling information, as shown in FIG. 1.

101. A UE configures a carrier as a primary carrier and configures other carriers as secondary carriers according to an indication message sent by a network.

102. The UE sets a reporting format, where the reporting format includes a first reporting format and a second reporting format, the first reporting format includes UPH (UE Power Headroom, UE power headroom) information, TEBS (Total E-DCH Buffer Status, total E-DCH buffer status) information, HLBS (Highest priority Logical channel Buffer Status, highest priority logical channel buffer status) information, and HLID (Highest priority Logical channel ID, highest priority logical channel ID) information in sequence from left to right, a total length of the second reporting format is the same as that of the first reporting format, the second reporting format includes first information and second information, the first information includes UPH information of one or more secondary carriers, and the second information includes reserved bit information or format identification bit information.

103. The UE reports SI information in the reporting format to the network, where the primary carrier uses the first reporting format to report the SI information, and the secondary carriers use the first reporting format or the second reporting format to report the SI information.

In the method for reporting scheduling information in this embodiment of the present invention, a user equipment sets a first reporting format and a second reporting format, and then reports SI information of a primary carrier in the first reporting format, including UPH information, TEBS information, HLBS information, and HLID information, and reports UPH information of a secondary carrier in the first reporting format or the second reporting format. In this way, SI information of all carriers is reported. This embodiment of the present invention is especially applicable to reporting SI information of multiple carriers, and can effectively save system resources as compared with the prior art.

Figure 2:
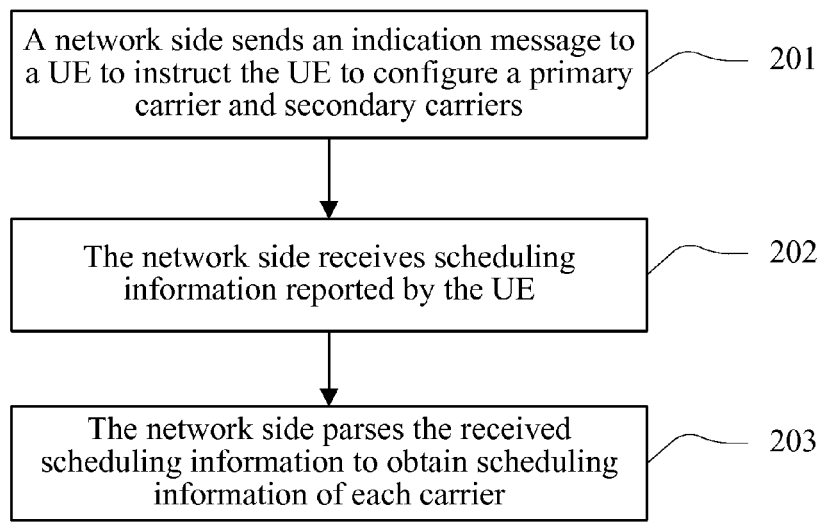
FIG. 2 is a flowchart of a method according to another embodiment of the present invention.

Another embodiment of the present invention provides a method for reporting scheduling information, as shown in FIG. 2.

201. A network sends an indication message to a UE to instruct the UE to configure a carrier as a primary carrier and configure other carriers as secondary carriers.

202. The network receives SI information reported by the UE, where the SI information is reported in a first reporting format through the primary carrier and in the first reporting format or a second reporting format through the secondary carriers, the first reporting format includes UPH information, TEBS information, HLBS information, and HLID information in sequence from left to right, a total length of the second reporting format is the same as that of the first reporting format, the second reporting format includes first information and second information, the first information includes UPH information of one or more secondary carriers, and the second information includes reserved bit information or format identification bit information.

203. The network parses the received SI information to obtain SI information of each carrier.

In this embodiment of the present invention, the network may include a base station or a base station controller, but is not limited to this.

In the method for reporting SI information according to this embodiment of the present invention, a network instructs a UE to set a primary carrier and a secondary carrier, so that the UE reports SI information of the primary carrier in a first reporting format, and reports SI information of the secondary carrier in the first reporting format or a second reporting format; and the network receives and parses the SI information to obtain SI information of each carrier. Compared with the prior art, this embodiment of the present invention can effectively save system resources and is especially applicable to reporting SI information of multiple carriers.

Figure 3:
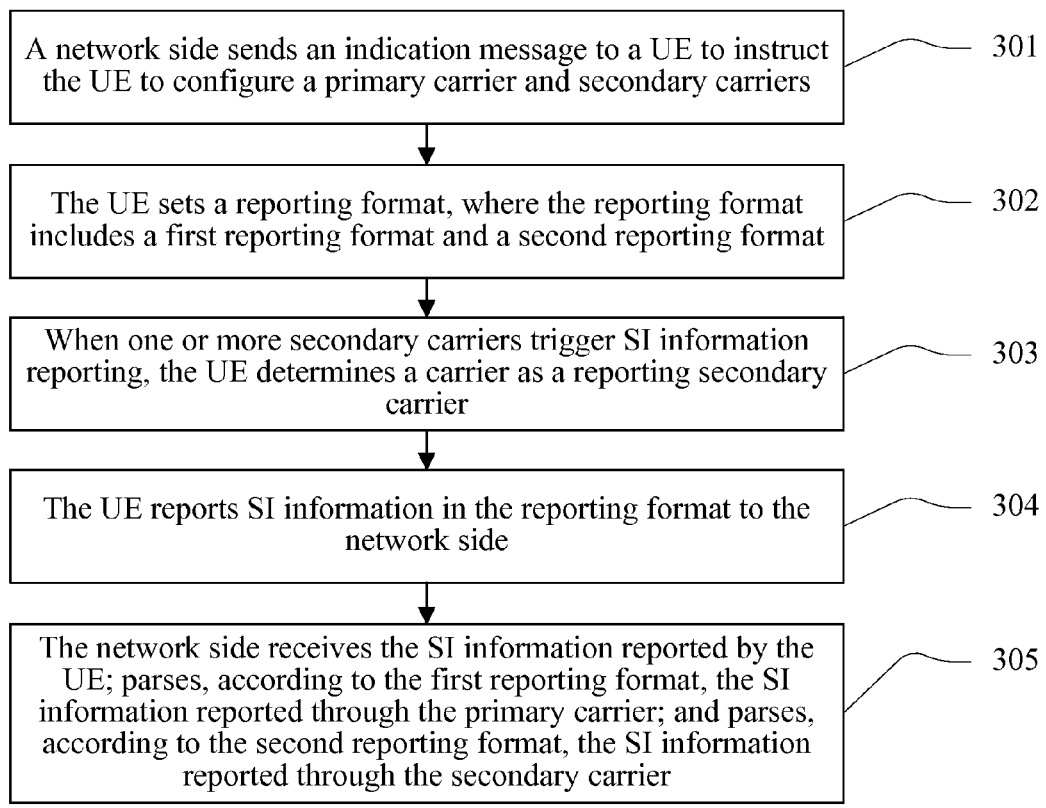
FIG. 3 is a flowchart of a method according to still another embodiment of the present invention.

Still another embodiment of the present invention provides a method for reporting scheduling information, as shown in FIG. 3.

301. A network sends an indication message to a UE, so that the UE configures a carrier as a primary carrier and configures other carriers as secondary carriers according to the indication message.

For ease of understanding, in this embodiment of the present invention, reporting SI information of four carriers is used as an example for description. The four carriers are a carrier 1, a carrier 2, a carrier 3, and a carrier 4. In this embodiment of the present invention, the UE sets the carrier 1 as the primary carrier and sets the carrier 2, the carrier 3, and the carrier 4 as the secondary carriers according to the indication message.

302. The UE sets a reporting format, where the reporting format includes a first reporting format and a second reporting format, the first reporting format includes UPH information, TEBS information, HLBS information, and HLID information of the primary carrier in sequence from left to right, a total length of the second reporting format is the same as that of the first reporting format, the second reporting format includes first information and second information, the first information includes UPH information of one or more secondary carriers, the second information is reserved bit information, and the second reporting format is set in sequence from left to right as follows: UPH information of each secondary carrier, and the reserved bit information; the reserved bit information is bit information in the second reporting format except for UPH information of each secondary carrier, and a length of the remaining bit information is smaller than a length of the UPH information of each secondary carrier; and the UPH information of each secondary carrier is arranged in sequence according to a sequence of the secondary carriers, that is, UPH information of the carrier 2, the carrier 3, and the carrier 4 are included in sequence, or UPH information of the carrier 4, the carrier 3, and the carrier 2 may be included in sequence.

303. When one or more secondary carriers trigger to report SI information, the UE determines a secondary carrier as a reporting secondary carrier from the secondary carriers, where the reporting secondary carrier reports UPH information of the one or more secondary carriers in the second reporting format.

For example, the UE determines a secondary carrier, which has data to be sent in a current TTI (Transmission Time Interval, transmission time interval) and has a spare position to carry scheduling information, as a reporting secondary carrier.

For example, the UE determines a secondary carrier, which has data to be sent in the current TTI but does not have a spare position to carry the scheduling information, as the reporting secondary carrier.

For example, the UE determines a secondary carrier, which does not have data to be sent in the current TTI but has a best uplink channel condition in the current transmission time interval, as the reporting secondary carrier.

For example, the UE determines a secondary carrier, which does not have data to be sent in the current TTI but has a greatest service authorization value and has an activated process, as the reporting secondary carrier.

304. The UE reports SI information in the reporting format to the network, where SI information of the primary carrier is reported in the first reporting format, and SI information of the secondary carriers is reported in the second reporting format through the reporting secondary carrier.

It should be noted that for one UE, all carriers share a buffer, and therefore buffer-related information in SI information of all carriers is the same. That is, TEBS information, HLBS information, and HLID information of a carrier is the same as that of another carrier. Therefore, in this embodiment of the present invention, only TEBS, and HLBS, and HLID information in the SI information is reported by the primary carrier, and UPH information of each secondary carrier is reported by the reporting secondary carrier.

For example, when only the primary carrier triggers to report the SI information, the primary carrier uses the first reporting format to report the SI information.

For example, when the primary carrier and one or more secondary carriers trigger to report SI information, the primary carrier uses the first reporting format to report the SI information and the reporting secondary carrier uses the second reporting format to report the UPH information of the one or more secondary carriers.

For example, when a secondary carrier triggers to report SI information, the primary carrier needs to be triggered to use the first reporting format to report the SI information of the primary carrier, and the reporting secondary carrier uses the second reporting format to report SI information of the secondary carrier.

305. The network receives the SI information reported by the UE; parses, according to the first reporting format, the SI information reported by the primary carrier; parses, according to the second reporting format, the SI information reported by the secondary carrier; and obtains, according to the TEBS information, HLBS information, and HLID information in the SI information reported by the primary carrier and the UPH information of each secondary carrier, SI information of each carrier.

For example, in this embodiment of the present invention, common 18-bit SI information in the prior art may be used as an example for description, but this is not a limitation herein. The UPH is 5 bits, the TEBS is 5 bits, the HLBS is 4 bits, the HLID is 4 bits, and Rev is 3 bits. In this embodiment of the present invention, each piece of SI information can carry UPH information of at most three carriers, and therefore, four-carrier SI information can be reported by two carriers. It should be noted that when only three carriers among multiple uplink carriers are set to report SI information or when a secondary carrier is in a deactivated state, a UPH at a corresponding position in the second reporting format is set to a default value agreed between the user equipment and the network.

In the method for reporting scheduling information according to this embodiment of the present invention, a UE reports SI information of each carrier in a reporting format, specifically including: reporting SI information of a primary carrier in a first reporting format, and reporting SI information of a secondary carrier in a second reporting format. According to this embodiment of the present invention, system resources can be effectively saved when the UE reports the SI information on multiple carriers; and a network can easily identify SI information of different carriers, thereby ensuring accuracy of the SI information reporting.

Figure 4:
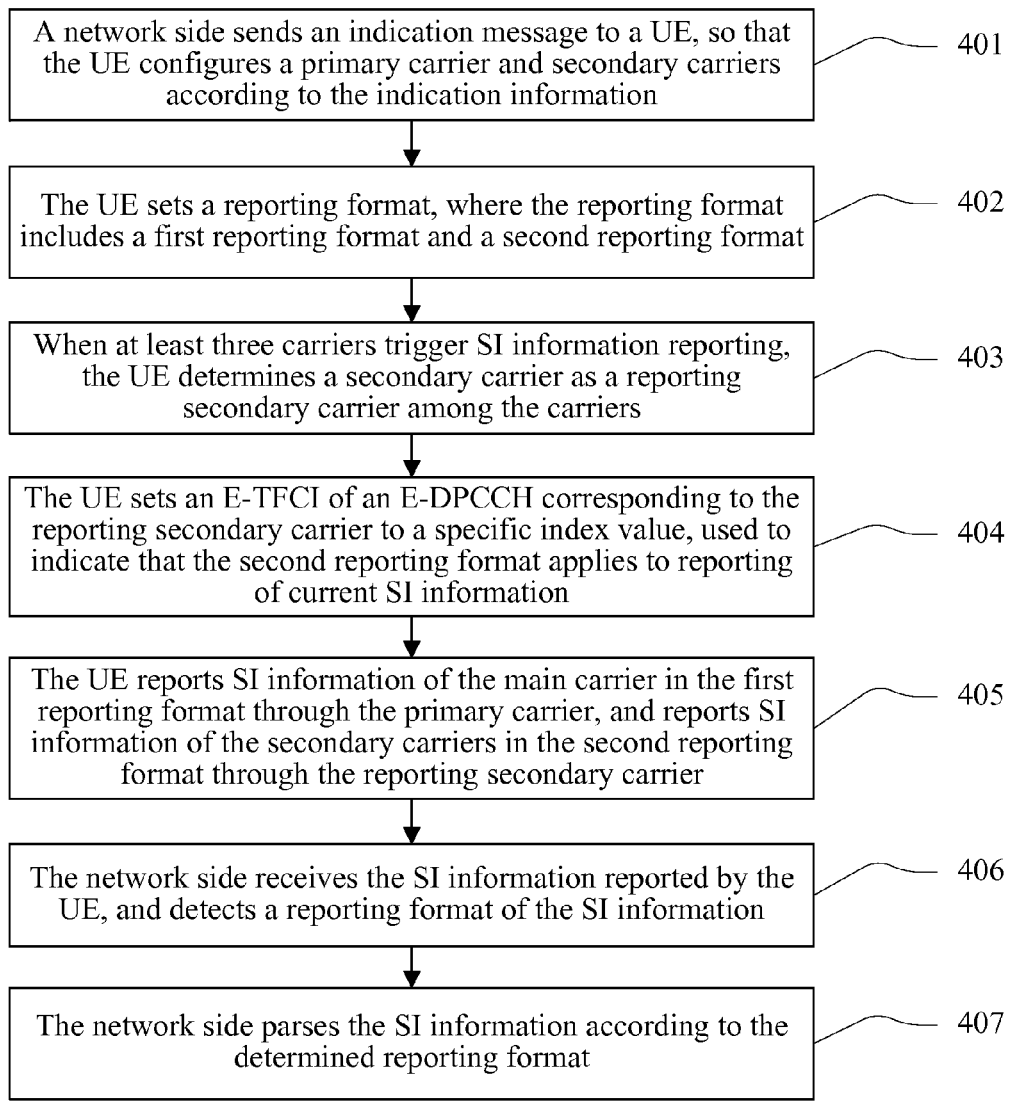
FIG. 4 is a flowchart of a method according to still another embodiment of the present invention.

Still another embodiment of the present invention provides a method for reporting scheduling information, as shown in FIG. 4.

401. A network sends an indication message to a UE, so that the UE configures a carrier as a primary carrier and configures other carriers as secondary carriers according to the indication message.

For ease of understanding, in this embodiment of the present invention, reporting SI information of four carriers is used as an example for description. The four carriers are a carrier 1, a carrier 2, a carrier 3, and a carrier 4. In this embodiment of the present invention, the UE sets the carrier 1 as the primary carrier and sets the carrier 2, the carrier 3, and the carrier 4 as the secondary carriers according to the indication message.

402. The UE sets a reporting format, where the reporting format includes a first reporting format and a second reporting format, the first reporting format includes UPH information, TEBS information, HLBS information, and HLID information of the primary carrier in sequence from left to right, a total length of the second reporting format is the same as that of the first reporting format, the second reporting format includes first information and second information, the first information includes UPH information of one or more secondary carriers, the second information is reserved bit information, and the second reporting format is set in sequence from left to right as follows: UPH information of each secondary carrier, and the reserved bit information; the reserved bit information is bit information in the second reporting format except for the UPH information of each secondary carrier, and a length of the remaining bit information is smaller than a length of the UPH information of each secondary carrier; and the UPH information of the secondary carriers are arranged in sequence according to a sequence of the secondary carriers, that is, UPH information of the carrier 2, the carrier 3, and the carrier 4 are included in sequence, or UPH information of the carrier 4, the carrier 3, and the carrier 2 may be included in sequence.

403. When at least three carriers trigger to report SI information, the UE determines a secondary carrier from the carriers as a reporting secondary carrier.

For the method for determining, by the UE, a secondary carrier from the carriers as a reporting secondary carrier, reference may be made to the method described in Embodiment 3, and no further details are provided herein.

404. The UE sets an E-TFCI (Enhanced Transport Format Combination Indicator, enhanced transport format combination indicator) in an E-DPCCH (Enhanced Dedicated Physical Control Channel, enhanced dedicated physical control channel) corresponding to the reporting secondary carrier to a specific index value, used to indicate that the second reporting format is used to report current SI information, where the E-DPCCH is an associated channel of an E-DPDCH (Enhanced Dedicated Physical Data Channel, enhanced dedicated physical data channel) on which the SI information is reported.

For example, an E-TFCI in the E-DPCCH and a TB Size (Transport Block Size, transport block size) are in one-to-one correspondence. Some TB Sizes are restricted in terms of use, and E-TFCIs corresponding to the TB Sizes indicate that an E-DPDCH corresponding to a current E-DPCCH cannot use the first reporting format to report the SI information. The UE may set the E-TFCI in the E-DPCCH corresponding to the reporting secondary carrier to an E-TFCI that corresponds to a TB Size with restricted use to serve as a specific index value, so as to indicate that the second reporting format is used to report the current SI information.

For example, the UE sets the E-TFCI to a value agreed between the network and the user equipment, where the agreed value is used to indicate that the second reporting format is used to report the current SI information.

405. The UE reports SI information of the primary carrier in the first reporting format through the primary carrier, and reports SI information of the secondary carriers in the second reporting format through the reporting secondary carrier.

406. The network receives the SI information reported by the UE, and detects a reporting format of the SI information.

If the SI information is reported by the primary carrier, the SI information uses the first reporting format.

If the SI information is reported by the secondary carrier, it is detected whether an E-TFCI field in the E-DPCCH corresponding to the secondary carrier that reports an SI information is the specific index value; and if the E-TFCI field in the E-DPCCH corresponding to the secondary carrier that reports the SI information is the specific index value, the scheduling information reported by the secondary carrier uses the second reporting format, and includes UPH information of each secondary carrier and the reserved bit information in sequence from left to right; if the E-TFCI field in the E-DPCCH corresponding to the secondary carrier that reports the SI information is not the specific index value, the scheduling information reported by the secondary carrier uses the first reporting format.

407. The network parses the SI information according to the determined reporting format, and obtains SI information of each carrier according to the TEBS information, HLBS information, and HLID information in the SI information reported by the primary carrier and the UPH information of each secondary carrier.

For example, when one or two carriers trigger to report the SI information, the one or two carriers use the first reporting format to report the SI information. When receiving SI information reported by one carrier or SI information reported by two secondary carriers, the network parses the SI information according to the first reporting format.

In this embodiment of the present invention, each piece of SI information can carry UPH information of at most three carriers, and therefore four-carrier SI information can be reported by two carriers. It should be noted that when only three carriers among multiple uplink carriers are set to report SI information or when a secondary carrier from the secondary carriers is in a deactivated state, a corresponding UPH in the second reporting format is set to a default value agreed between the user equipment and the network.

In the method for reporting scheduling information according to this embodiment of the present invention, when one or two carriers trigger to report SI information, a first reporting format is used for the reporting. When at least three carriers trigger to report SI information, a primary carrier uses the first reporting format to report SI information, and a reporting secondary carrier uses a second reporting format to report SI information of each secondary carrier; and a network receives the SI information, and determines a reporting format of the SI information by detecting an E-TFCI in an E-DPCCH that corresponds to the secondary carrier reporting the SI information, thereby ensuring accuracy of SI information receiving. Compared with the prior art, this embodiment of the present invention can effectively save system resources during reporting of SI information of multiple carriers; and the network can identify the reporting format of the SI information by detecting the E-TFCI, thereby ensuring accuracy of the SI information reporting.

Figure 5:
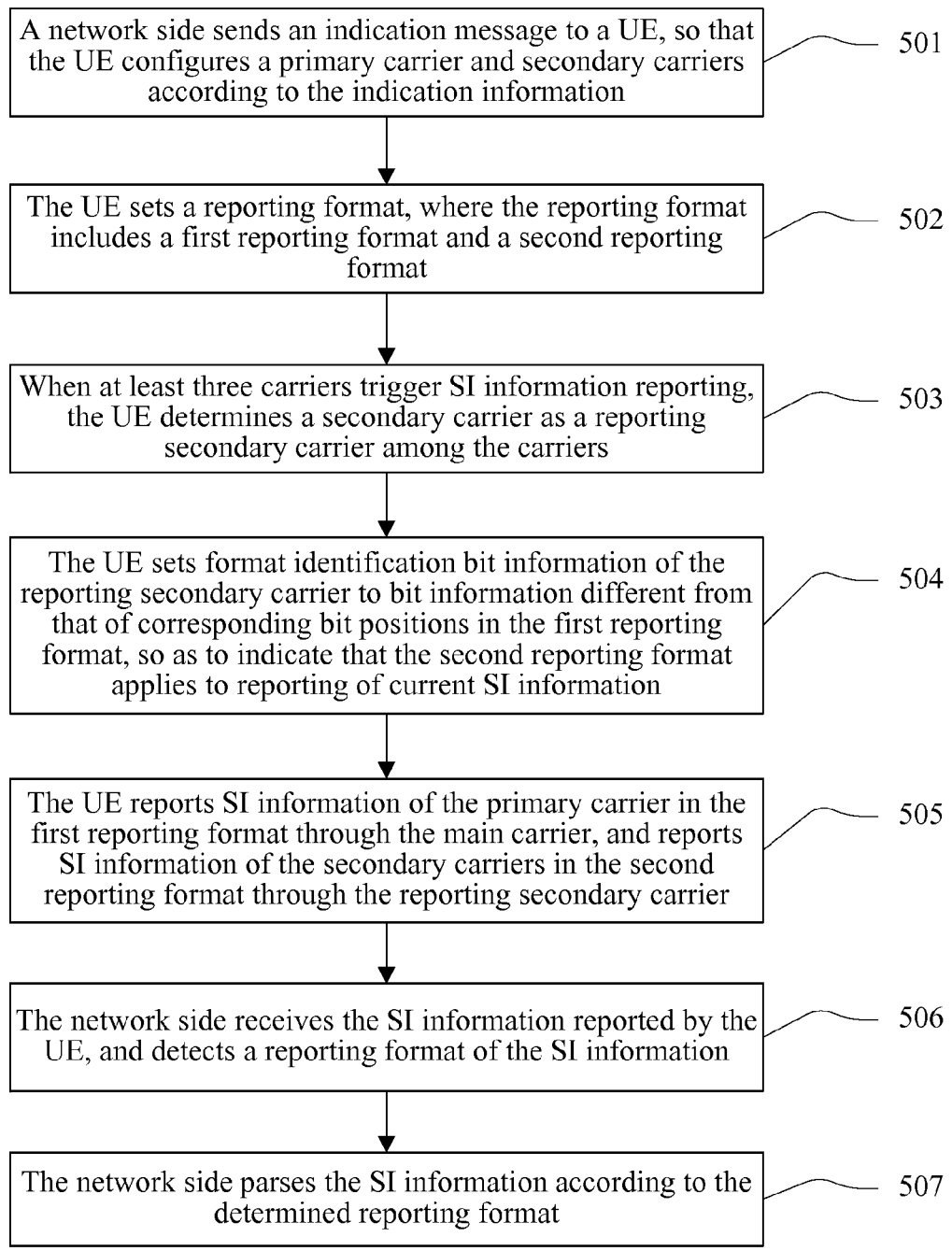
FIG. 5 is a flowchart of a method according to still another embodiment of the present invention.

Still another embodiment of the present invention provides a method for reporting scheduling information, as shown in FIG. 5.

501. A network sends an indication message to a UE to instruct the UE to configure a carrier as a primary carrier and configure other carriers as secondary carriers.

502. The UE sets a reporting format, where the reporting format includes a first reporting format and a second reporting format, the first reporting format includes UPH information, TEBS information, HLBS information, and HLID information of the primary carrier in sequence from left to right, a total length of the second reporting format is the same as that of the first reporting format, the second reporting format includes first information and second information, the first information includes UPH information of one or more secondary carriers, the second information is format identification bit information, and the second reporting format is set in sequence from left to right as follows: UPH information of each secondary carrier, and the format identification bit information; and the format identification bit information is used to indicate that current SI information uses the second reporting format, and the UPH information of the secondary carriers are arranged in sequence according to a sequence of the secondary carriers.

503. When at least three carriers trigger to report SI information, the UE determines a carrier from the carriers as a reporting secondary carrier, where the reporting secondary carrier is used to report SI information of each secondary carrier in the second reporting format.

For the method for determining, by the UE, a secondary carrier from the carriers as a reporting secondary carrier, reference may be made to the method described in Embodiment 3, and no further details are provided herein.

504. The UE sets format identification bit information in the reporting secondary carrier to bit information different from that of a corresponding bit position in the first reporting format, so as to indicate that the second reporting format is used to report current SI information.

For ease of understanding, in this embodiment of the present invention, 18-bit SI information is used as an example for description, but this is not a limitation. In the SI information, the UPH is 5 bits, the TEBS is 5 bits, the HLBS is 4 bits, the HLID is 4 bits, and the format identification bit information is 3 bits. Then the second reporting format is bit information of a 16th bit to 18th bit from left to right in the SI information. For example, if bit information of the 16th bit to 18th bit from left to right in the first reporting format is 111, the format identification bit information in the second reporting format is set to any value other than 111.

Alternatively, the UE may set the format identification bit information in the second reporting format to a value agreed between the UE and the network, where the agreed value is used to indicate that the second reporting format is used to report the current SI information.

505. The UE reports SI information of the primary carrier in the first reporting format through the primary carrier, and reports SI information of the secondary carriers in the second reporting format through the reporting secondary carrier.

506. The network receives the SI information reported by the UE, and detects a reporting format of the SI information.

If the SI information is reported by the primary carrier, the SI information uses the first reporting format.

It is detected whether bit information of a second information position in the SI information reported by the secondary carrier is the same as bit information of a corresponding position in the SI information reported by the primary carrier; and if the bit information of the second information position in the SI information reported by the secondary carrier is the same as the bit information of the corresponding position in the SI information reported by the primary carrier, the SI information reported by the secondary carrier uses the first reporting format; if the bit information of the second information position in the SI information reported by the secondary carrier is different from the bit information of the corresponding position in the SI information reported by the primary carrier, the SI information reported by the secondary carrier uses the second reporting format.

507. The network parses the SI information according to the determined reporting format, and obtains SI information of each carrier according to the TEBS information, HLBS information, and HLID information in the SI information reported by the primary carrier and the UPH information of each secondary carrier.

It should be noted that when one or two carriers trigger to report the SI information, the one or two carriers use the first reporting format to report the SI information. When receiving SI information reported by one carrier or SI information reported by two secondary carriers, the network parses the SI information according to the first reporting format.

In this embodiment of the present invention, each piece of SI information can carry UPH information of at most three carriers, and therefore, four-carrier SI information can be reported by two carriers. It should be noted that when only three carriers among multiple uplink carriers are set to report SI information or when a secondary carrier from the secondary carriers is in a deactivated state, a corresponding UPH in the second reporting format is set to a default value agreed between the user equipment and the network.

In the method for reporting scheduling information according to this embodiment of the present invention, when one or two carriers trigger to report SI information, a first reporting format is used for the reporting. When at least three carriers trigger to report the SI information, a primary carrier uses the first reporting format to report SI information, and a reporting secondary carrier uses a second reporting format to report SI information of each secondary carrier; and a network receives the SI information, and determines a reporting format of the SI information by detecting whether bit information of a second information position in the SI information reported by the secondary carrier is the same as bit information of a corresponding position in the SI information reported by the primary carrier, thereby ensuring accuracy of SI information receiving. Compared with the prior art, this embodiment of the present invention can effectively save system resources during reporting of SI information of multiple carriers; and the network can identify the reporting format of the SI information by detecting whether the bit information of the second information position in the SI information reported by the secondary carrier is the same as the bit information of the corresponding position in the SI information reported by the primary carrier, thereby ensuring accuracy of the SI information reporting.

Figure 6:
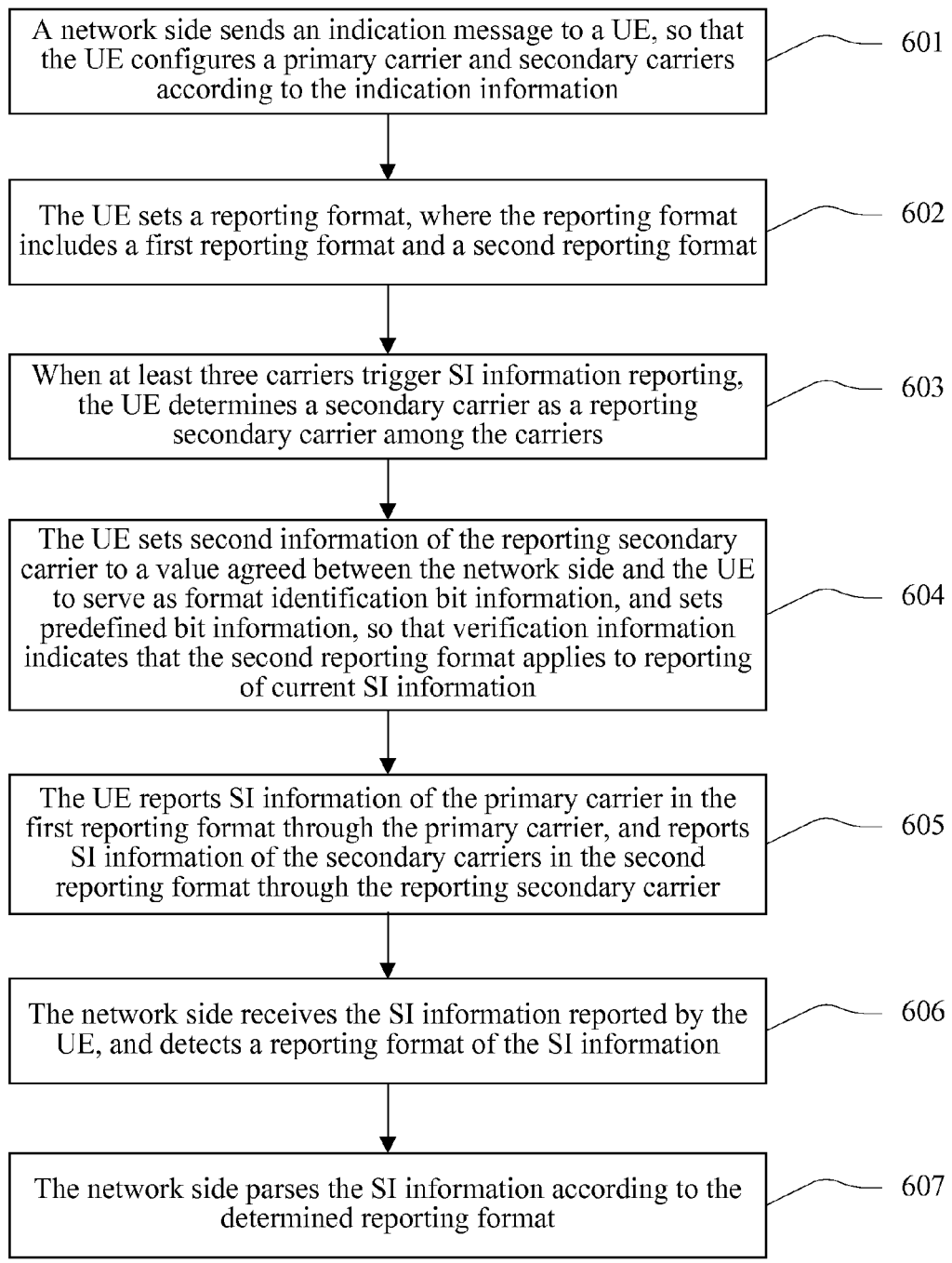
FIG. 6 is a flowchart of a method according to still another embodiment of the present invention.

Still another embodiment of the present invention provides a method for reporting scheduling information, as shown in FIG. 6.

601. A network sends an indication message to a UE to instruct the UE to configure a carrier as a primary carrier and configure other carriers as secondary carriers.

For ease of understanding, in this embodiment of the present invention, reporting SI information of four carriers is used as an example for description. The four carriers are a carrier 1, a carrier 2, a carrier 3, and a carrier 4. In this embodiment of the present invention, the UE sets the carrier 1 as the primary carrier and sets the carrier 2, the carrier 3, and the carrier 4 as the secondary carriers according to the indication message.

602. The UE sets a reporting format, where the reporting format includes a first reporting format and a second reporting format.

The first reporting format includes UPH information, TEBS information, HLBS information, and HLID information of the primary carrier in sequence from left to right, a total length of the second reporting format is the same as that of the first reporting format, the second reporting format includes first information and second information, the first information includes UPH information of one or more secondary carriers, the second information is format identification bit information, and the second reporting format includes the following in sequence from left to right: remaining information of the first information, and verification information; the remaining information of the first information is bit string information obtained after predefined bit information is removed from the first information, the predefined bit information is bit information of any position in the first information, and complete UPH information and incomplete UPH information in the remaining information of the first information are arranged according to a sequence of the secondary carriers; and the verification information includes the format identification bit information and the predefined bit information, and positions of the format identification bit information and the predefined bit information in the verification information are agreed in advance between the network and the UE.

For ease of understanding, in this embodiment of the present invention, 18-bit SI information is used as an example for description, but this is not a limitation. The UPH is 5 bits, the TEBS is 5 bits, the HLBS is 4 bits, the HLID is 4 bits, and Rev is 3 bits, where the Rev is the second information.

For example, the second reporting format may be as follows: From left to right, information of a 1st bit to a 10th bit is UPH information of the carrier 1 and the carrier 2, information of a 11th bit to a 14th bit and predefined bit information of a 15th bit to a 18th bit are UPH information of the carrier 3, and the 15th bit to the 18th are the verification information; or from left to right, information of a 5 th bit to a 14th bit is UPH information of the carrier 2 and the carrier 3, information of a 1st bit to a 4th bit and predefined bit information in a 15th bit to a 18th bit are UPH information of the carrier 1, and the 15th bit to the 18th bit are the verification information; or from left to right, information of a 1st bit to a 5th bit and information of a 10th bit to a 14th bit are UPH information of the carrier 1 and the carrier 3, information of a 6th bit to a 9th bit and predefined bit information in a 15th bit to a 18th bit are UPH information of the carrier 2, and the 15th bit to the 18th bit are the verification information.

Positions of the format identification bit information and the predefined bit information in the information of the 15th bit to the 18th bit are agreed in advance between the network and the UE.

For example, the verification information may be bit information of an HLID which cannot be used to report SI information in the first reporting format in a CELL-DCH (Cell Dedicated Channel, Cell Dedicated Channel) state; or bit information that corresponds to a logical channel number of an HLID, used to report SI information only in the second reporting format, agreed between the UE and the network.

For example, according to the protocol TS25.321, an HLID is formed by 4 bits, where 0000-1101 indicate logical channels 1 to 14, 1110 indicates a common control channel, and 1111 indicates that an "enhanced dedicated channel radio network temporary identity" is included. In the CELL-DCH state, a highest-priority logical channel whose HILD is 1110 or 1111 cannot be used to report SI information in the first reporting format. Therefore, the UE may set a 15th bit to a 17th bit to 111 and place information of any bit in UPH information of any secondary carrier into a position of a 18th bit, so as to indicate that the second reporting format is used to report current SI information. When receiving the SI information, the network determines whether values of the bit 15th bit to the 17th bit in the SI information are 111; and if the values of the bit 15th bit to the 17th bit in the SI information are 111, determines that the SI information uses a second format, if the values of the bit 15th bit to the 17th bit in the SI information are not 111, uses a first format.

Alternatively, for logical channel numbers 0000-1101 agreed between the UE and the network, some logical channels can be used to report SI information only in the second reporting format. Then, the format identification bit information may also be set to such a logical channel number agreed between the UE and the network, so as to identify the second reporting format.

603. When at least three carriers trigger to report SI information, the UE determines a secondary carrier from the carriers as a reporting secondary carrier.

For the method for determining, by the UE, a secondary carrier from the carriers as a reporting secondary carrier, reference may be made to the method described in Embodiment 3, and no further details are provided herein.

604. The UE sets second information of the reporting secondary carrier to a value agreed between the network and the UE to serve as the format identification bit information, and sets a position of the predefined bit information in the verification information, so that the verification information can indicate that the second reporting format is used to report current scheduling information. For the specific method for setting the verification information, reference may be made to step 602 and no further details are provided herein.

605. The UE reports SI information of the primary carrier in the first reporting format through the primary carrier, and reports SI information of the secondary carriers in the second reporting format through the reporting secondary carrier.

606. The network receives the SI information reported by the UE, and detects a reporting format of the SI information.

If the SI information is reported by the primary carrier, the SI information uses the first reporting format.

If the SI information is reported by the secondary carrier, verification information in the SI information reported by the secondary carrier is detected to determine whether format identification bit information in the verification information is a value agreed between the network and the UE; and if the format identification bit information in the verification information is the value agreed between the network and the UE, the SI information reported by the secondary carrier uses the second reporting format, where the second reporting format includes the following in sequence from left to right: the remaining information of the first information, and the verification information; the remaining information of the first information is the bit string information obtained after the predefined bit information is removed from the first information, the predefined bit information is the bit information of any position in the first information, and the complete UPH information and incomplete UPH information in the remaining information of the first information are arranged according to the sequence of the secondary carriers; and the verification information includes the format identification bit information and the predefined bit information; if the format identification bit information in the verification information is not the value agreed between the network and the UE, the SI information reported by the secondary carrier uses the first reporting format.

607. The network parses the SI information according to the determined reporting format, and obtains SI information of each carrier according to the TEBS information, HLBS information, and HLID information in the SI information reported by the primary carrier and the UPH information of each secondary carrier.

It should be noted that when one or two carriers trigger to report the SI information, the one or two carriers use the first reporting format to report the SI information. When receiving SI information reported by one carrier or SI information reported by two secondary carriers, the network parses the SI information according to the first reporting format.

In this embodiment of the present invention, each piece of SI information can carry UPH information of at most three carriers, and therefore four-carrier SI information can be reported by two carriers. It should be noted that when only three carriers among multiple uplink carriers are set to report SI information or when a secondary carrier from the secondary carriers is in a deactivated state, a corresponding UPH in the second reporting format is set to a default value agreed between the user equipment and the network.

In the method for reporting scheduling information according to this embodiment of the present invention, when one or two carriers trigger to report SI information, a first reporting format is used for the reporting. When at least three carriers trigger to report SI information, a primary carrier uses the first reporting format to report SI information, and a reporting secondary carrier uses a second reporting format to report SI information of each secondary carrier; and a network receives the SI information, and determines a reporting format of the SI information by detecting bit information that represents a position of HLID information in the SI information reported by the secondary carrier, thereby ensuring accuracy of SI information receiving. Compared with the prior art, this embodiment of the present invention can effectively save system resources during reporting of SI information of multiple carriers; and the network can identify the reporting format of the SI information by detecting the bit information that represents the position of the HLID information in the SI information reported by the secondary carrier, thereby ensuring accuracy of the SI information reporting.

Figure 7:
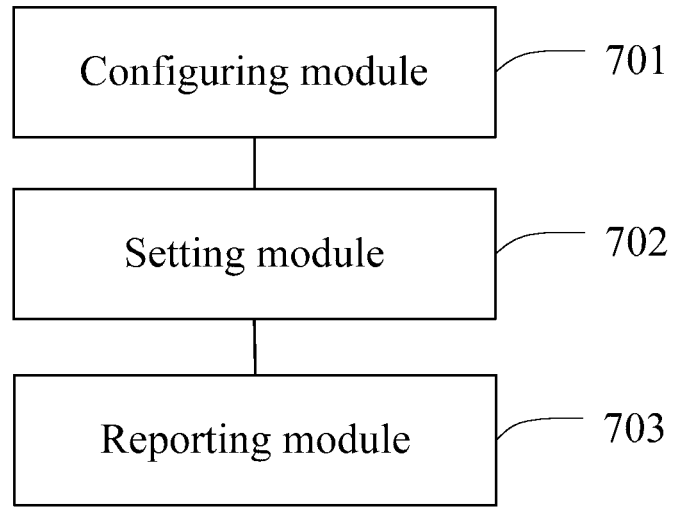
FIG. 7 to FIG. 10 are schematic diagrams of apparatuses for reporting scheduling information according to still another embodiment of the present invention.

Still another embodiment of the present invention provides an apparatus for reporting scheduling information. For example, the apparatus for reporting scheduling information may be a user equipment, or a part of a user equipment. As shown in FIG. 7, the apparatus includes a configuring module 701, a setting module 702, and a reporting module 703, where:

the configuring module 701 is configured to configure a carrier as a primary carrier and configure other carriers as secondary carriers according to an indication message sent by a network;

the setting module 702 is configured to set a reporting format, where the reporting format includes a first reporting format and a second reporting format, the first reporting format includes a user equipment headroom UPH, a total enhanced dedicated channel buffer status TEBS, a highest priority logical channel buffer status HLBS, and a highest priority logical channel identity HLID in sequence from left to right, a total length of the second reporting format is the same as that of the first reporting format, the second reporting format includes first information and second information, the first information includes UPH information of one or more secondary carriers, and the second information includes reserved bit information or format identification bit information; and the reporting module 703 is configured to report SI information in the reporting format to the network, where the primary carrier uses the first reporting format to report the SI information, and the secondary carriers use the first reporting format or the second reporting format to report the SI information.

Figure 8:
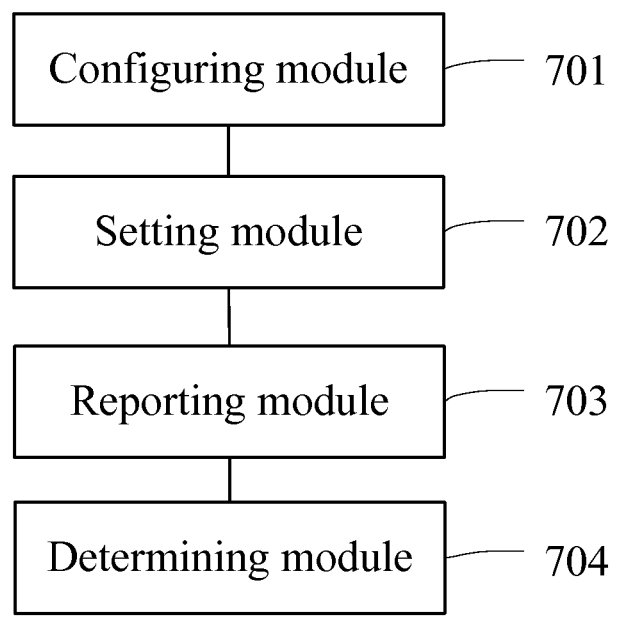

In another embodiment of the present invention, as shown in FIG. 8, the apparatus further includes: a determining module 704, configured to determine a secondary carrier as a reporting secondary carrier from the secondary carriers, where the reporting secondary carrier is used to report the SI information of the secondary carriers in the second reporting format.

In another embodiment of the present invention, the determining module 704 is configured to determine a secondary carrier, which has data to be sent in a current TTI and has a spare position to carry the SI information, as the reporting secondary carrier.

In another embodiment of the present invention, a secondary carrier that has data to be sent in the current TTI but does not have a spare position to carry the SI information is determined as the reporting secondary carrier.

In another embodiment of the present invention, a secondary carrier that does not have data to be sent in the current TTI but has a best uplink channel condition in the current transmission time interval is determined as the reporting secondary carrier.

In another embodiment of the present invention, a secondary carrier that does not have data to be sent in the current TTI but has a greatest service authorization value and has an activated process is determined as the reporting secondary carrier.

In another embodiment of the present invention, the setting module 702 is specifically configured to set the second information in the second reporting format to the reserved bit information, where the reserved bit information is bit information in the second reporting format except for UPH information of each secondary carrier, and a length of the remaining bit information is smaller than a length of UPH information of each secondary carrier; the second reporting format is set in sequence from left to right as follows: UPH information of each secondary carrier, and the reserved bit information; and the UPH information of the secondary carriers are arranged in sequence according to a sequence of the secondary carriers.

In another embodiment of the present invention, the reporting module 703 is specifically configured to, when a secondary carrier triggers to report SI information, report SI information of the secondary carrier in the second reporting format through the reporting secondary carrier, and report the SI information of the primary carrier in the first reporting format through the primary carrier.

In another embodiment of the present invention, the reporting module is further configured to, when a secondary carrier is in a deactivated state, set a UPH corresponding to the secondary carrier in the second reporting format to a default value agreed between the user equipment and the network.

Figure 9:
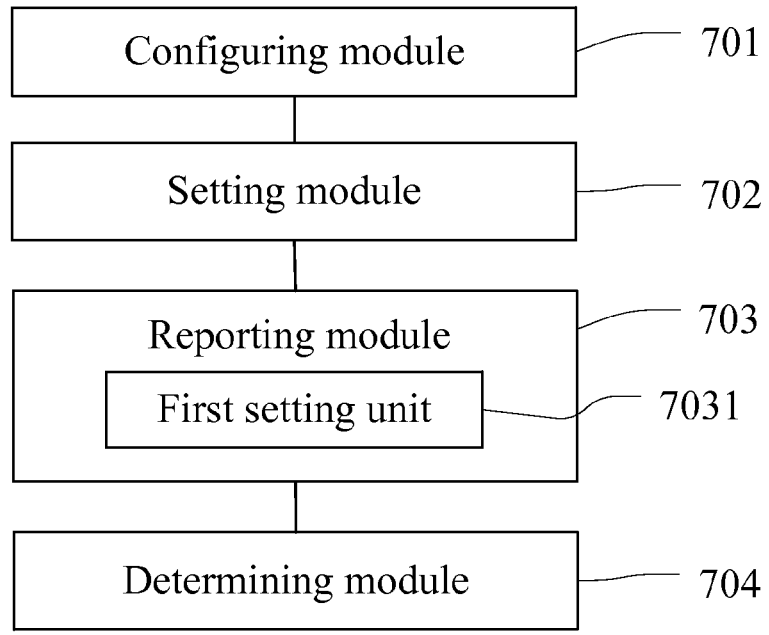

In another embodiment of the present invention, as shown in FIG. 9, the reporting module 703 further includes: a first setting unit 7031, configured to, when the SI information is reported in the second reporting format through the reporting secondary carrier, set an E-TFCI of an E-DPCCH corresponding to the reporting secondary carrier to a specific index value, where the specific index value is used to indicate that the second reporting format is used to report current SI information and the E-DPCCH is an associated channel of an E-DPDCH on which the SI information is reported.

In another embodiment of the present invention, the first setting unit 7031 is configured to set the E-TFCI to an E-TFCI value that corresponds to a TB Size with restricted use in the E-DPDCH to serve as the specific index value, so as to indicate that the second reporting format is used to report the current SI information.

In another embodiment of the present invention, the first setting unit 7031 sets the E-TFCI to a value agreed between the network and the user equipment to serve as the specific index value, where the agreed value is used to indicate that the second reporting format is used to report the current SI information.

Figure 10:
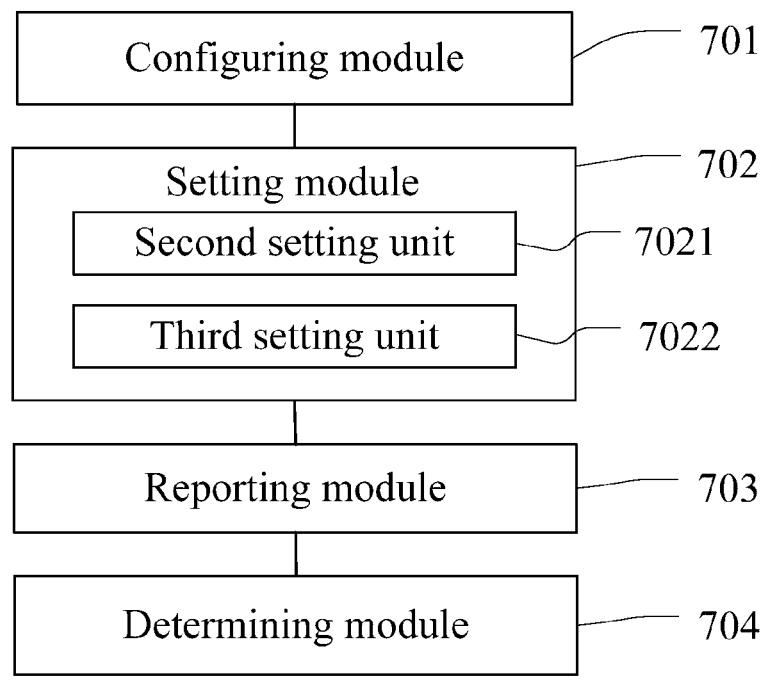

According to the apparatus shown in FIG. 8, further, as shown in FIG. 10, the setting module 702 is configured to set the second information in the second reporting format to the format identification bit information, used to indicate that the second reporting format is used to report the current SI information, where the second reporting format is set in sequence from left to right as follows: UPH information of each secondary carrier, and the format identification bit information; and the UPH information of the secondary carriers are arranged in sequence according to the sequence of the secondary carriers.

In another embodiment of the present invention, the second reporting format includes the following in sequence from left to right: last-bit information in UPH information of any secondary carrier, the format identification bit information, the remaining bit information in the UPH information of any secondary carrier, and UPH information of other secondary carriers, where the remaining bit information in the UPH information of any secondary carrier and the UPH information of other secondary carriers are arranged in sequence according to the sequence of the secondary carriers.

For example, the setting module 702 includes a second setting unit 7021 and/or a third setting unit 7022.

In another embodiment of the present invention, the second setting unit 7021 is configured to set the second information in the second reporting format to bit information different from that of a corresponding bit position in the first reporting format to serve as format identification bit information, so as to indicate that the second reporting format is used to report the current SI information.

In another embodiment of the present invention, the second setting unit 7021 is configured to set the second information in the second reporting format to a value agreed between the network and the user equipment to serve as the format identification bit information, where the agreed value is used to indicate that the second reporting format is used to report the current SI information.

The second reporting format is set in sequence from left to right as follows: UPH information of each secondary carrier, and the format identification bit information, where the UPH information of the secondary carriers are arranged in sequence according to the sequence of the secondary carriers.

The third setting unit 7022 is configured to set the second information to a value agreed between the network and the user equipment to serve as the format identification bit information, so that the format identification bit information and predefined bit information form verification information; and set a position of the predefined bit information in the verification information, so that the verification information is used to indicate that the second reporting format is used to report the current scheduling information, where the predefined bit information is bit information of any position in the first information.

The second reporting format includes the following in sequence from left to right: the remaining information of the first information, and the verification information, where the remaining information of the first information is bit string information obtained after the predefined bit information is removed from the first information, and complete UPH information and incomplete UPH information in the remaining information of the first information are arranged according to the sequence of the secondary carriers; and the verification information includes the format identification bit information and the predefined bit information.

For example, the reporting module 703 is configured to, when one or two carriers trigger to report SI information, report the SI information in the first reporting format.

When at least three carriers trigger to report SI information, the reporting module 703 is configured to report the SI information of the primary carrier in the first reporting format through the primary carrier, and report the SI information of the secondary carriers in the second reporting format through the reporting secondary carrier.

For example, the reporting module 703 is further configured to, when a secondary carrier is in a deactivated state, set a UPH corresponding to the secondary carrier in the second reporting format to a default value agreed between the user equipment and the network.

In the apparatus for reporting scheduling information according to this embodiment of the present invention, a setting module 702 sets a reporting format, where the reporting format includes a first reporting format and a second reporting format, and a reporting module 703 reports SI information in the reporting format. Compared with the prior art, the apparatus for reporting scheduling information according to this embodiment of the present invention can effectively save system resources during reporting of SI information of multiple carriers, and can also ensure accuracy of the SI information reporting.

Figure 11:
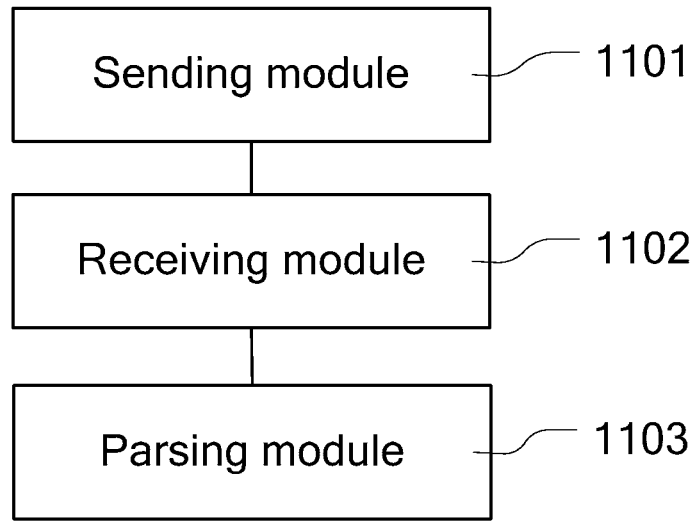
FIG. 11 to FIG. 13 are schematic diagrams of apparatuses for processing scheduling information according to still another embodiment of the present invention.

Still another embodiment of the present invention provides an apparatus for processing scheduling information. For example, the apparatus for processing scheduling information may be a base station, or a part of a base station. As shown in FIG. 11, the apparatus includes: a sending module 1101, a receiving module 1102, and a parsing module 1103.

The sending module 1101 is configured to send an indication message to a user equipment to instruct the user equipment to configure a carrier as a primary carrier and configure other carriers as secondary carriers.

The receiving module 1102 is configured to receive SI information reported by the user equipment, where the SI information is reported in a first reporting format through the primary carrier, is reported in the first reporting format or a second reporting format through the secondary carriers, the first reporting format includes a user equipment headroom UPH, a total enhanced dedicated channel buffer status TEBS, a highest priority logical channel buffer status HLBS, and a highest priority logical channel identity HLID in sequence from left to right, a total length of the second reporting format is the same as that of the first reporting format, the second reporting format includes first information and second information, the first information includes UPH information of one or more secondary carriers, and the second information includes reserved bit information or format identification bit information.

The parsing module 1103 is configured to parse the SI information received by the receiving module to obtain SI information of each carrier, where the SI information reported by the primary carrier is parsed according to the first reporting format, and the SI information reported by the secondary carriers is parsed according to the first reporting format or the second reporting format.

For example, the parsing module 1103 is configured to parse, according to the first reporting format, the SI information reported by the primary carrier; and parse, according to the second reporting format, the SI information reported by the secondary carriers, where the second reporting format includes UPH information of each secondary carrier and the reserved bit information in sequence from left to right, and UPH information of the secondary carriers are arranged according to a sequence of the secondary carriers.

Figure 12:
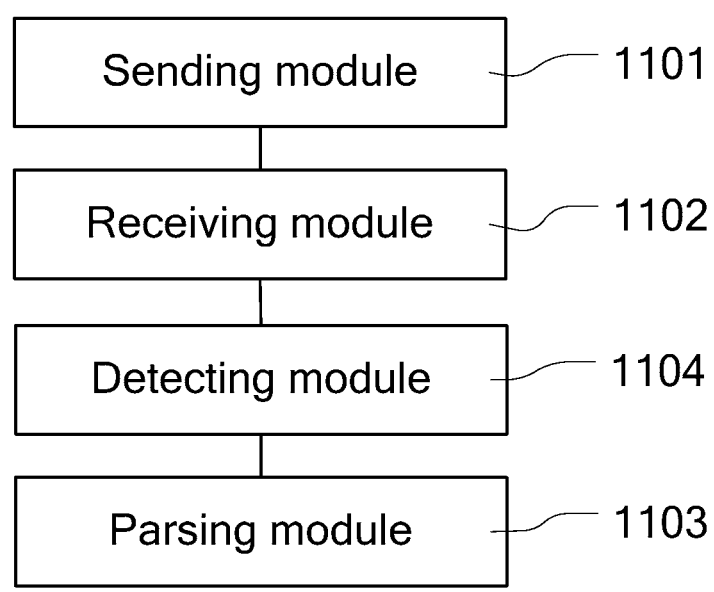
Figure 13:
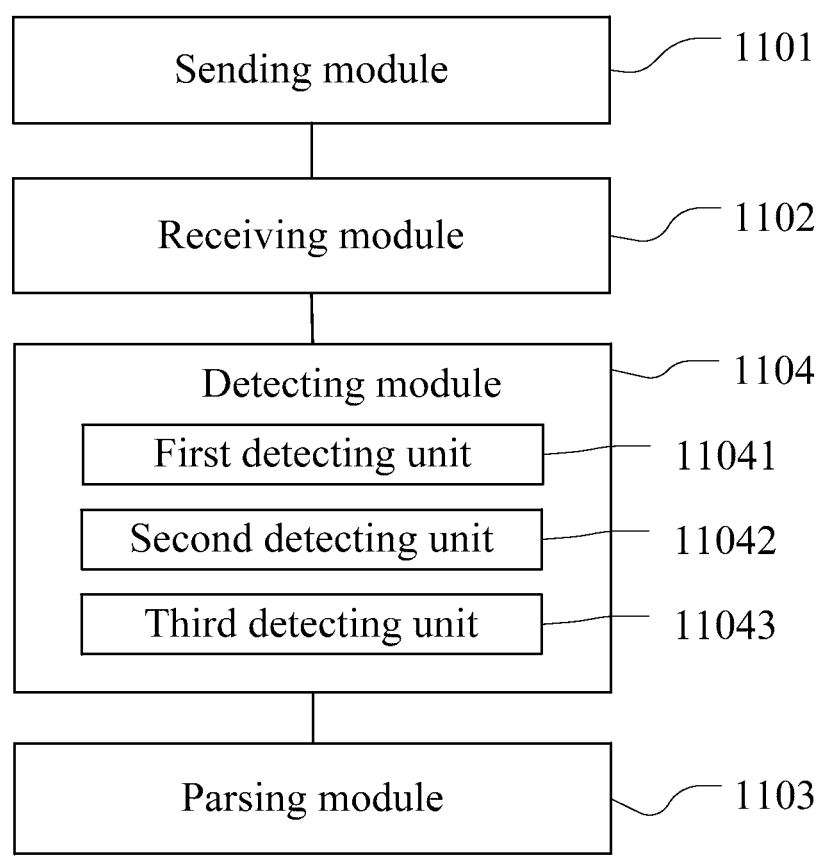

In another embodiment of the present invention, as shown in FIG. 12, the apparatus further includes a detecting module 1104, where the detecting module 1104 is configured to detect a reporting format of the SI information that is reported by the secondary carriers and received by the receiving module 1102.

In another embodiment of the present invention, the detecting module 1104 includes a first detecting unit 11041, a second detecting unit 11042, and/or a third detecting unit 11043.

In another embodiment of the present invention, the first detecting unit 11041 is configured to detect whether an E-TFCI field in an E-DPCCH corresponding to a secondary carrier that reports a SI information is a specific index value, where the specific index value is used to indicate that the second reporting format is used to report current SI information; and if the E-TFCI field in the E-DPCCH corresponding to the secondary carrier that reports the SI information is the specific index value, the SI information reported by the secondary carrier uses the second reporting format, and includes UPH information of each secondary carrier and the reserved bit information in sequence from left to right; if the E-TFCI field in the E-DPCCH corresponding to the secondary carrier that reports the SI information is not the specific index value, the SI information reported by the secondary carrier uses the first reporting format, where the specific index value includes an E-TFCI value that corresponds to a transform block size TB Size with restricted use in the E-DPDCH, or a value agreed between a network and the user equipment.

In another embodiment of the present invention, the second detecting unit 11042 is configured to detect whether bit information of a second information position in SI information reported by a secondary carrier is the same as bit information of a corresponding position in the SI information reported by the primary carrier; and if the bit information of the second information position in the SI information reported by the secondary carrier is the same as the bit information of the corresponding position in the SI information reported by the primary carrier, the SI information reported by the secondary carrier uses the first reporting format; if the bit information of the second information position in the SI information reported by the secondary carrier is different from the bit information of the corresponding position in the SI information reported by the primary carrier, the SI information reported by the secondary carrier uses the second reporting format, which includes UPH information of each secondary carrier and the second information in sequence from left to right, where the second information is the format identification bit information.

In another embodiment of the present invention, the third detecting unit 11043 is configured to detect verification information in scheduling information reported by a secondary carrier and determine whether format identification bit information in the verification information is a value agreed between the network and the user equipment; and if the format identification bit information in the verification information is the value agreed between the network and the user equipment, the SI information reported by the secondary carrier uses the second reporting format, where the second reporting format includes the following in sequence from left to right: the remaining information of the first information, and the verification information; the remaining information of the first information is bit string information obtained after predefined bit information is removed from the first information, the predefined bit information is bit information of any position in the first information, and complete UPH information and incomplete UPH information in the remaining information of the first information are arranged according to the sequence of the secondary carriers; and the verification information includes the format identification bit information and the predefined bit information; if the format identification bit information in the verification information is not the value agreed between the network and the user equipment, the SI information reported by the secondary carrier uses the first reporting format.

In another embodiment of the present invention, the parsing module 1103 is specially configured to parse, according to the first reporting format, the SI information reported by the primary carrier, and parse, according to the reporting format determined by the detecting module 1104, the SI information reported by the secondary carriers.

In another embodiment of the present invention, the parsing module 1103 is further specifically configured to, when the receiving module 1102 receives SI information reported by one carrier or SI information reported by two secondary carriers, parse the received SI information according to the first reporting format.

In the apparatus for processing scheduling information according to this embodiment of the present invention, a sending module 1101 sends an indication message to a UE to instruct the UE to configure a primary carrier and a secondary carrier; and a receiving module 1102 receives SI information reported by the UE, and SI information of each carrier is acquired through a parsing module 1103. Compared with the prior art, the apparatus provided in this embodiment of the present invention can effectively save system resources and ensure accuracy of SI information parsing, and is applicable to reporting of SI information of multiple carriers.

It should be noted that the method provided in the embodiments of the present invention also applies to uplink MIMO (Multiple Input Multiple Output, multiple input multiple output technology), and especially applies to scheduling information reporting when three or four streams exist on an uplink channel. An implementation method for reporting the main stream SI of the primary carrier corresponds to the implementation method for reporting SI of the primary carrier according to an embodiment of the present invention, and an implementation method for reporting SI of a supplementary stream of the primary carrier as well as SI of a main stream and a supplementary stream of a secondary carrier corresponds to the implementation method for reporting SI of a secondary carrier according to an embodiment of the present invention, and no further details are provided herein.

It may be clearly understood by a person skilled in the art that, for the purpose of convenient and brief description, reference may be made to the corresponding process in the foregoing method embodiments for the detailed working process of the foregoing system, apparatus, and unit, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

It should be noted that the foregoing embodiments are merely intended for describing the technical solutions of the present invention other than limiting the present invention. Although the present invention is described in detail with reference to the foregoing embodiments, a person of ordinary skill in the art should understand that modifications may still be made to the technical solutions described in the foregoing embodiments, or equivalent replacements may be made to some technical features thereof, without departing from the idea and scope of the technical solutions of the embodiments of the present invention.

What is claimed is:

1. A method for reporting scheduling information, comprising:
   configuring a carrier as a primary carrier and configuring other carriers as secondary carriers according to an indication message sent by a network;
   setting a reporting format, wherein the reporting format comprises a first reporting format and a second reporting format, the first reporting format comprises a user equipment headroom (UPH), a total enhanced dedicated channel buffer status (TEBS), a highest priority logical channel buffer status (HLBS), and a highest priority logical channel identity (HLID) in sequence from left to right, a total length of the second reporting format is the same as that of the first reporting format, the second reporting format comprises first information and second information, the first information comprises UPH information of one or more secondary carriers, and the second information comprises one of reserved bit information and format identification bit information; and
   reporting scheduling information in the reporting format to the network, wherein scheduling information of the primary carrier is reported in the first reporting format, and scheduling information of the secondary carriers is reported in one of the first reporting format and the second reporting format.

2. The method according to claim 1, further comprising:
   determining a secondary carrier as a reporting secondary carrier from the secondary carriers before reporting the scheduling information, wherein the reporting secondary carrier is used to report the scheduling information of the secondary carriers in the second reporting format.

3. The method according to claim 2, further comprising one of:
   determining a secondary carrier that has data to be sent in a current transmission time interval and has a spare position to carry scheduling information as the reporting secondary carrier;
   determining a secondary carrier that has data to be sent in a current transmission time interval but does not have a spare position to carry scheduling information as the reporting secondary carrier;
   determining a secondary carrier that does not have data to be sent in a current transmission time interval but has a best uplink channel condition in the current transmission time interval as the reporting secondary carrier; and
   determining a secondary carrier that does not have data to be sent in a current transmission time interval but has a greatest service authorization value and has an activated process as the reporting secondary carrier.

4. The method according to claim 1, wherein the second information in the second reporting format is set to the reserved bit information, the reserved bit information is bit information in the second reporting format except for UPH information of each secondary carrier, and a length of the remaining bit information is smaller than a length of the UPH information of each secondary carrier; and
   the second reporting format is set in sequence from left to right as follows: the UPH information of each secondary carrier, and the reserved bit information; and the UPH information of the secondary carriers are arranged in sequence according to a sequence of the secondary carriers.

5. The method according to claim 4, wherein the reporting the scheduling information in the reporting format to the network comprises:
   reporting scheduling information of the secondary carrier in the second reporting format through the reporting secondary carrier if a secondary carrier triggers to report scheduling information; and
   reporting the scheduling information of the primary carrier in the first reporting format through the primary carrier.

6. The method according to claim 4, wherein the reporting the scheduling information in the reporting format to the network comprises:
   setting an enhanced transport format combination indicator (E-TFCI) in an enhanced dedicated physical control channel (E-DPCCH) corresponding to the reporting secondary carrier to a specific index value if scheduling information of a secondary carrier is reported in the second reporting format through the reporting secondary carrier, wherein the specific index value is used to indicate that the second reporting format is used to report current scheduling information, and the E-DPCCH is an associated channel of an enhanced dedicated physical data channel (E-DPDCH) on which the scheduling information is reported.

7. The method according to claim 6, further comprising one of:
   setting the E-TFCI to an E-TFCI value that corresponds to a transform block size (TB Size) with restricted use in the E-DPDCH to serve as the specific index value, to indicate that the second reporting format is used to report the current scheduling information; and
   setting the E-TFCI to a value agreed between the network and a user equipment to serve as the specific index value, wherein the agreed value is used to indicate that the second reporting format is used to report the current scheduling information.

8. The method according to claim 6, further comprising one of:
   reporting the scheduling information in the first reporting format if one or two carriers trigger to report scheduling information; and
   reporting the scheduling information of the primary carrier in the first reporting format through the primary carrier if at least three carriers trigger to report scheduling information, and reporting the scheduling information of the secondary carriers in the second reporting format through the reporting secondary carrier.

9. The method according to claim 1, further comprising:
   setting the second information in the second reporting format to the format identification bit information;
   wherein, the second reporting format is set in sequence from left to right as follows: UPH information of each secondary carrier, and the format identification bit information; and the UPH information of the secondary carriers are arranged in sequence according to a sequence of the secondary carriers.

10. The method according to claim 9, further comprising one of:

setting the second information in the second reporting format to bit information different from that of a corresponding bit position in the first reporting format to serve as the format identification bit information, to indicate that the second reporting format is used to report current scheduling information; and setting the second information in the second reporting format to a value agreed between the network and a user equipment to serve as the format identification bit information, wherein the agreed value is used to indicate that the second reporting format is used to report current scheduling information.

11. The method according to claim 1, wherein the second information in the second reporting format is set to the format identification bit information; and the second reporting format comprises the following in sequence from left to right: remaining information of the first information, and verification information; the remaining information of the first information is bit string information obtained after predefined bit information is removed from the first information, the predefined bit information is bit information of any position in the first information, and complete UPH information and incomplete UPH information in the remaining information of the first information are arranged according to a sequence of the secondary carriers; and the verification information comprises the format identification bit information and the predefined bit information.

12. The method according to claim 11, wherein setting the second information in the second reporting format to the format identification bit information comprises:

setting the second information to a value agreed between the network and a user equipment to serve as the format identification bit information; and setting a position of the predefined bit information in the verification information, so that the verification information indicates that the second reporting format is used to report current scheduling information.

13. A method for reporting scheduling information, comprising:

sending an indication message to a user equipment to instruct the user equipment to configure a carrier as a primary carrier and configure other carriers as secondary carriers;

receiving scheduling information reported by the user equipment, wherein the scheduling information is reported in a first reporting format through the primary carrier, the scheduling information is reported in one of the first reporting format and a second reporting format through the secondary carriers, the first reporting format comprises a user equipment headroom (UPH), a total enhanced dedicated channel buffer status (TEBS), a highest priority logical channel buffer status (HLBS), and a highest priority logical channel identity (HLID) in sequence from left to right, a total length of the second reporting format is the same as that of the first reporting format, the second reporting format comprises first information and second information, the first information comprises UPH information of one or more secondary carriers, and the second information comprises one of reserved bit information and format identification bit information; and parsing the received scheduling information to obtain scheduling information of each carrier.

14. The method according to claim 13, wherein the parsing the received scheduling information to obtain the scheduling information of each carrier comprises:

parsing, according to the first reporting format, the scheduling information reported by the primary carrier; and parsing, according to the second reporting format, the scheduling information reported by the secondary carriers;

wherein the second reporting format comprises UPH information of each secondary carrier and the reserved bit information in sequence from left to right, and UPH information of the secondary carriers are arranged according to a sequence of the secondary carriers.

15. The method according to claim 13, further comprising at least one of:

detecting whether an enhanced transport format combination indicator (E-TFCI) field in an enhanced dedicated physical control channel (E-DPCCH) corresponding to a secondary carrier that reports a scheduling message is a specific index value, wherein the specific index value is used to indicate that the second reporting format is used to report current scheduling information; and if the E-TFCI field in the E-DPCCH corresponding to the secondary carrier that reports the scheduling message is the specific index value, determining that the scheduling information reported by the secondary carrier uses the second reporting format, and comprises UPH information of each secondary carrier and the reserved bit information in sequence from left to right; if the E-TFCI field in the E-DPCCH corresponding to the secondary carrier that reports the scheduling message is not the specific index value, determining that the scheduling information reported by the secondary carrier uses the first reporting format, wherein the specific index value comprises one of an E-TFCI value that corresponds to a transform block size (TB Size) with restricted use in the E-DPDCH, and a value agreed between a network and the user equipment;

detecting whether bit information of a second information position in scheduling information reported by a secondary carrier is the same as bit information of a corresponding position in the scheduling information reported by the primary carrier; and if the bit information of the second information position in the scheduling information reported by the secondary carrier is the same as the bit information of the corresponding position in the scheduling information reported by the primary carrier, the scheduling information reported by the secondary carrier uses the first reporting format; if the bit information of the second information position in the scheduling information reported by the secondary carrier is different from the bit information of the corresponding position in the scheduling information reported by the primary carrier, the scheduling information reported by the secondary carrier uses the second reporting format, which comprises UPH information of each secondary carrier and the second information in sequence from left to right, and the second information is the format identification bit information; and detecting verification information in scheduling information reported by a secondary carrier and determining whether format identification bit information in the verification information is a value agreed between a network and the user equipment; and if the format identification bit information in the verification information is the value agreed between the network and the user equipment, the scheduling information reported by the secondary carrier uses the second reporting format, and the second reporting format comprises the following in sequence from left to right: remaining information of the first information, and the verification information; the remaining information of the first information is bit string information obtained after predefined bit information is removed from the first information, the predefined bit information is bit information of any position in the first information, and complete UPH information and incomplete UPH information in the remaining information of the first information are arranged according to a sequence of the secondary carriers; and the verification information comprises the format identification bit information and the predefined bit information; if the format identification bit information in the verification information is not the value agreed between the network and the user equipment, the scheduling information reported by the secondary carrier uses the first reporting format.

16. An apparatus for reporting scheduling information, comprising:
a processor, configured to configure a carrier as a primary carrier and configure other carriers as secondary carriers according to an indication message sent by a network; the processor is further configured to set a reporting format, wherein the reporting format comprises a first reporting format and a second reporting format, the first reporting format comprises a user equipment headroom (UPH), a total enhanced dedicated channel buffer status (TEBS), a highest priority logical channel buffer status (HLBS), and a highest priority logical channel identity (HLID) in sequence from left to right, a total length of the second reporting format is the same as that of the first reporting format, the second reporting format comprises first information and second information, the first information comprises UPH information of one or more secondary carriers, and the second information comprises one of reserved bit information and format identification bit information; and
a transmitter, configured to report scheduling information in the reporting format to the network, wherein scheduling information of the primary carrier is reported in the first reporting format, and scheduling information of the secondary carriers is reported in the first reporting format or the second reporting format.

17. The apparatus according to claim 16, wherein, the processor is further configured to determine a secondary carrier as a reporting secondary carrier from the secondary carriers, wherein the reporting secondary carrier is used to report the scheduling information of the secondary carriers in the second reporting format.

18. The apparatus according to claim 16, wherein the processor is further configured to set the second information in the second reporting format to the reserved bit information, the reserved bit information is bit information in the second reporting format except for UPH information of each secondary carrier, and a length of the remaining bit information is smaller than a length of the UPH information of each secondary carrier; and
wherein, the second reporting format is set in sequence from left to right as follows: the UPH information of each secondary carrier, and the reserved bit information; and the UPH information of the secondary carriers are arranged in sequence according to a sequence of the secondary carriers.

19. The apparatus according to claim 18, wherein, the transmitter is further configured to report scheduling information of the secondary carrier in the second reporting format through the reporting secondary carrier if a secondary carrier triggers to report scheduling information, and report the scheduling information of the primary carrier in the first reporting format through the primary carrier.

20. The apparatus according to claim 18, wherein, the processor is further configured to set an enhanced transport format combination indicator (E-TFCI) in an enhanced dedicated physical control channel (E-DPCCH) corresponding to the reporting secondary carrier to a specific index value if the scheduling information is reported in the second reporting format by the reporting secondary carrier, wherein the specific index value is used to indicate that the second reporting format is used to report current scheduling information and the E-DPCCH is an associated channel of an enhanced dedicated physical data channel (E-DPDCH) on which the scheduling information is reported.

21. The apparatus according to claim 20, wherein the processor is further configured to set the E-TFCI to an E-TFCI value that corresponds to a transform block size (TB Size) with restricted use in the E-DPDCH to serve as the specific index value, wherein the E-TFCI value is used to indicate that the second reporting format is used to report the current scheduling information.

22. The apparatus according to claim 20, wherein the processor is further configured to set the E-TFCI to a value agreed between the network and a user equipment to serve as the specific index value, wherein the agreed value is used to indicate that the second reporting format is used to report the current scheduling information.

23. The apparatus according to claim 20, wherein,
the transmitter is further configured to report the scheduling information in the first reporting format if one or two carriers trigger to report scheduling information; and
the transmitter is further configured to report the scheduling information of the primary carrier in the first reporting format through the primary carrier if at least three carriers trigger to report scheduling information, and report the scheduling information of the secondary carriers in the second reporting format through the reporting secondary carrier.

24. The apparatus according to claim 16, wherein the processor is further configured to set the second information in the second reporting format to the format identification bit information, to indicate that the second reporting format is used to report current scheduling information.

25. The apparatus according to claim 24, wherein,
the processor is further configured to set the second information to a value agreed between the network and the user equipment to serve as the format identification bit information, so that the format identification bit information and predefined bit information form verification information; and set a position of the predefined bit information in the verification information, so that the verification information is used to indicate that the second reporting format is used to report the current scheduling information; and the predefined bit information is bit information of any position in the first information; and
the second reporting format comprises the following in sequence from left to right: remaining information of the first information, and the verification information; the remaining information of the first information is bit string information obtained after the predefined bit information is removed from the first information, and complete UPH information and incomplete UPH information in the remaining information of the first information are arranged according to a sequence of the secondary carriers; and the verification information comprises the format identification bit information and the predefined bit information.

26. An apparatus for processing scheduling information, comprising:
 a transmitter, configured to send an indication message to a user equipment to instruct the user equipment to configure a carrier as a primary carrier and configure other carriers as secondary carriers;
 a receiver, configured to receive scheduling information reported by the user equipment, wherein the scheduling information is reported in a first reporting format through the primary carrier, the scheduling information is reported in one of the first reporting format and a second reporting format through the secondary carriers, the first reporting format comprises a user equipment headroom (UPH), a total enhanced dedicated channel buffer status (TEBS), a highest priority logical channel buffer status (HLBS), and a highest priority logical channel identity (HLID) in sequence from left to right, a total length of the second reporting format is the same as that of the first reporting format, the second reporting format comprises first information and second information, the first information comprises UPH information of one or more secondary carriers, and the second information comprises one of reserved bit information and format identification bit information; and
 a processor, configured to parse the scheduling information to obtain scheduling information of each carrier.

27. The apparatus according to claim 26, wherein the processor is further configured to parse, according to the first reporting format, the scheduling information reported by the primary carrier; and parse, according to the second reporting format, the scheduling information reported by the secondary carriers, wherein the second reporting format comprises UPH information of each secondary carrier and the reserved bit information in sequence from left to right, and UPH information of the secondary carriers are arranged according to a sequence of the secondary carriers.

28. The apparatus according to claim 26, wherein the processor is further configured to detect whether an enhanced transport format combination indicator (E-TFCI) field in an enhanced dedicated physical control channel (E-DPCCH) corresponding to a secondary carrier that reports a scheduling message is a specific index value, wherein the specific index value is used to indicate that the second reporting format is used to report current scheduling information; and if the E-TFCI field is the specific index value, the scheduling information reported by the secondary carrier uses the second reporting format, and comprises UPH information of each secondary carrier and the reserved bit information in sequence from left to right; if the E-TFCI field is not the specific index value, the scheduling information reported by the secondary carrier uses the first reporting format, and the specific index value comprises one of an E-TFCI value that corresponds to a transform block size (TB Size) with restricted use in the E-DPDCH, and a value agreed between a network and the user equipment.

29. The apparatus according to claim 26, wherein the processor is further configured to detect whether bit information of a second information position in scheduling information reported by a secondary carrier is the same as bit information of a corresponding position in the scheduling information reported by the primary carrier; and if the bit information of the second information position in the scheduling information reported by the secondary carrier is the same as the bit information of the corresponding position in the scheduling information reported by the primary carrier, the scheduling information reported by the secondary carrier uses the first reporting format; if the bit information of the second information position in the scheduling information reported by the secondary carrier is different from the bit information of the corresponding position in the scheduling information reported by the primary carrier, the scheduling information reported by the secondary carrier uses the second reporting format, which comprises UPH information of each secondary carrier and the second information in sequence from left to right, and the second information is the format identification bit information.

30. The apparatus according to claim 26, wherein the processor is further configured to detect verification information in scheduling information reported by a secondary carrier and determine whether format identification bit information in the verification information is a value agreed between a network and the user equipment; and if the format identification bit information in the verification information is the value agreed between the network and the user equipment, the scheduling information reported by the secondary carrier uses the second reporting format, and the second reporting format comprises the following in sequence from left to right: remaining information of the first information, and the verification information; the remaining information of the first information is bit string information obtained after predefined bit information is removed from the first information, the predefined bit information is bit information of any position in the first information, and complete UPH information and incomplete UPH information in the remaining information of the first information are arranged according to a sequence of the secondary carriers; and the verification information comprises the format identification bit information and the predefined bit information; if the format identification bit information in the verification information is not the value agreed between the network and the user equipment, the scheduling information reported by the secondary carrier uses the first reporting format.

* * * * *